(No Model.) 2 Sheets—Sheet 1.

G. DEBOMBOURG.
FORGING AND WELDING MACHINE.

No. 571,344. Patented Nov. 17, 1896.

Witnesses.
H. van Oldenneel
E. A. Scott

Inventor
Guillaume Debombourg
by Richardson
Attorneys (No Model.) 2 Sheets—Sheet 2.

G. DEBOMBOURG.
FORGING AND WELDING MACHINE.

No. 571,344. Patented Nov. 17, 1896.

Witnesses
H. van Oldenneel
E. A. Scott

Inventor
Guillaume Debombourg
by Richards
Attorneys

United States Patent Office.

GUILLAUME DEBOMBOURG, OF COLLONGES, FRANCE, ASSIGNOR OF ONE-HALF TO GEORGE SAXON, JAMES SAXON, AND ALFRED SAXON, OF OPENSHAW, ENGLAND.

FORGING AND WELDING MACHINE.

SPECIFICATION forming part of Letters Patent No. 571,344, dated November 17, 1896.

Application filed October 25, 1895. Serial No. 566,876. (No model.)

*To all whom it may concern:*

Be it known that I, GUILLAUME DEBOMBOURG, a citizen of the Republic of France, residing at Collonges, Department of Rhone, France, have invented certain new and useful Improvements in Forging and Welding Machines, of which the following is a full, clear, and exact description.

The object of this invention is to construct a special machine which is applicable both for forging and for welding.

The invention comprises the special construction and arrangement of parts hereinafter described and particularly pointed out.

The manner in which this invention may be carried into practice will be readily understood from the following description, on reference to the accompanying drawings, of which—

Figure 2:
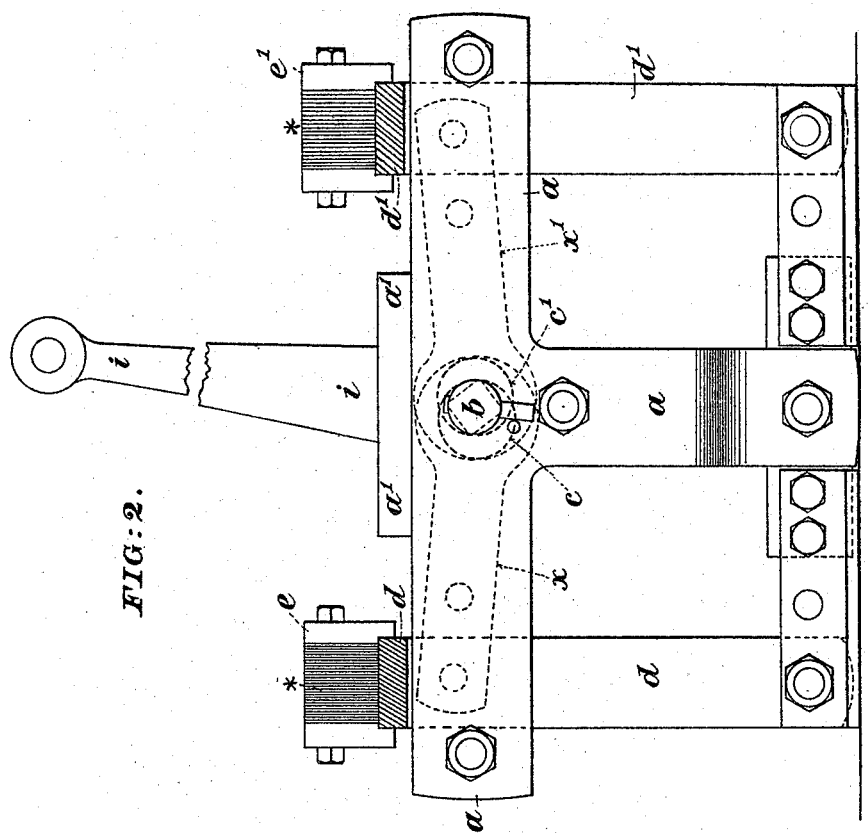
Figure 1:
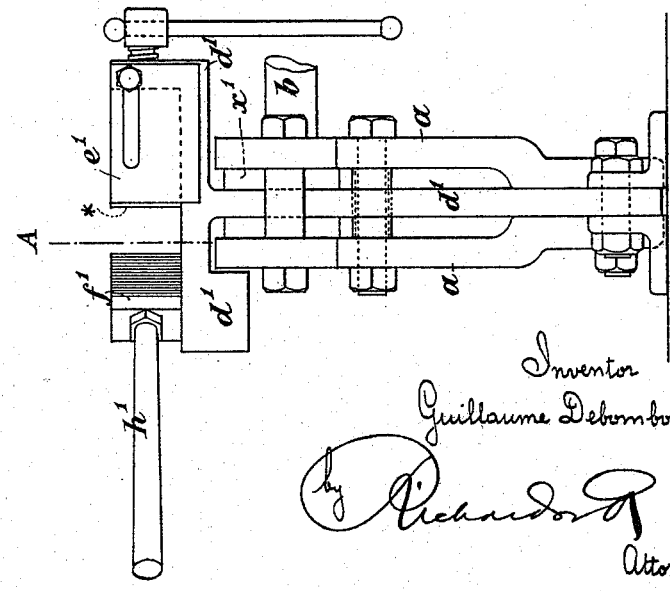
Figure 5:
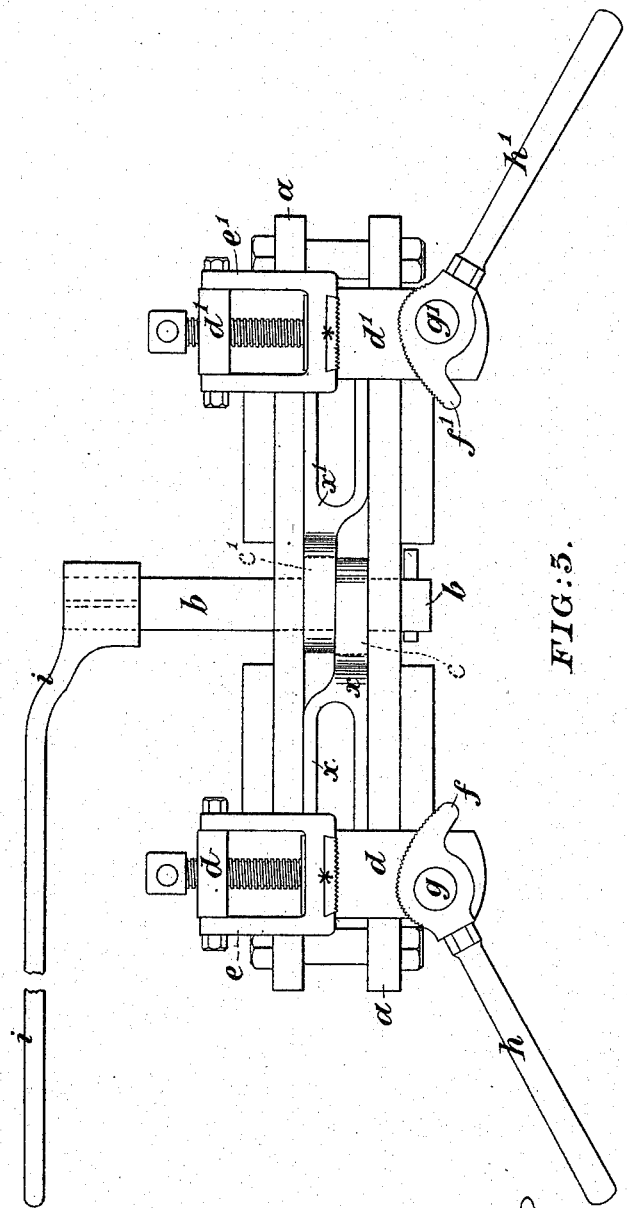

Figure 1 is an end elevation; Fig. 2, a side elevation, partly in section, through the line A on Fig. 1; and Fig. 3, a plan of one of my improved forging and welding machines.

$a$ is the framework of the machine; $b$, the central shaft above described. $c\ c'$ represent eccentrics shown dotted on Fig. 2. The said eccentrics $c\ c'$ carry the ends of the links $x\ x'$, connected to the brackets or levers $d\ d'$, respectively, the clamping devices being mounted at the upper ends of the said brackets or levers $d\ d'$, which are specially formed, as shown, for the purpose of carrying the said clamping devices. These clamping devices consist of adjustable sliding pieces $e\ e'$, serrated at the inner surface, as seen at *, and pivoted serrated eccentrics or sectors or curved cams $f\ f'$, carried on strong fixed centers $g\ g'$ and provided with handles $h\ h'$. $i$ is a long lever or handle for partially rotating the shaft $b$ in either direction, as required. $a'$, Fig. 2, is a loose anvil-block placed upon the frame $a$.

The various ways in which this machine can be used are too manifold to illustrate, but it will be evident without illustration that the clamping devices $e\ f\ e'\ f'$ may be used to hold heated iron or steel bars, or one to hold a heated iron or steel bar and the other a suitably formed die; or a die or block may be fixed upon the frame between the clamping devices, into or against which a heated metal bar held in either or each of the clamps $e\ f\ e'\ f'$ may be compressed.

Metal bars of any suitable section may be treated in this machine.

It will be noticed that the levers $d\ d'$ are adjustable toward and from each other, for which purpose the base and the links $x\ x'$ are provided with a plurality of openings.

I claim—

The combination of a frame composed of a base and two T-shaped uprights fixed to opposite sides thereof, the lateral arms of said uprights being connected; two upright levers pivotally and adjustably connected to opposite ends of the base and arranged to swing between the arms of the uprights of the frame; each of said levers carrying on its upper end above the frame, a clamping mechanism consisting of an adjustable jaw and a pivoted jaw positively operated by a lever to clamp the work between said jaw and the adjustable jaw; a shaft horizontally journaled in the upright members of the frame carrying between said members two eccentrics, links adjustably connecting said eccentrics with the pivoted levers and means for turning said shaft to positively swing the levers toward or from each other, substantially as described.

In witness whereof I have hereunto set my hand in presence of two witnesses.

G. DEBOMBOURG.

Witnesses:
AUGUSTE DESLORDE,
CHARLES A. DAVIES.